Dec. 5, 1939.                H. J. BYRNE                 2,182,310
          AUTOMATIC VARIABLE SPEED CONTROL MECHANISM
                    Filed Feb. 15, 1937        3 Sheets-Sheet 1
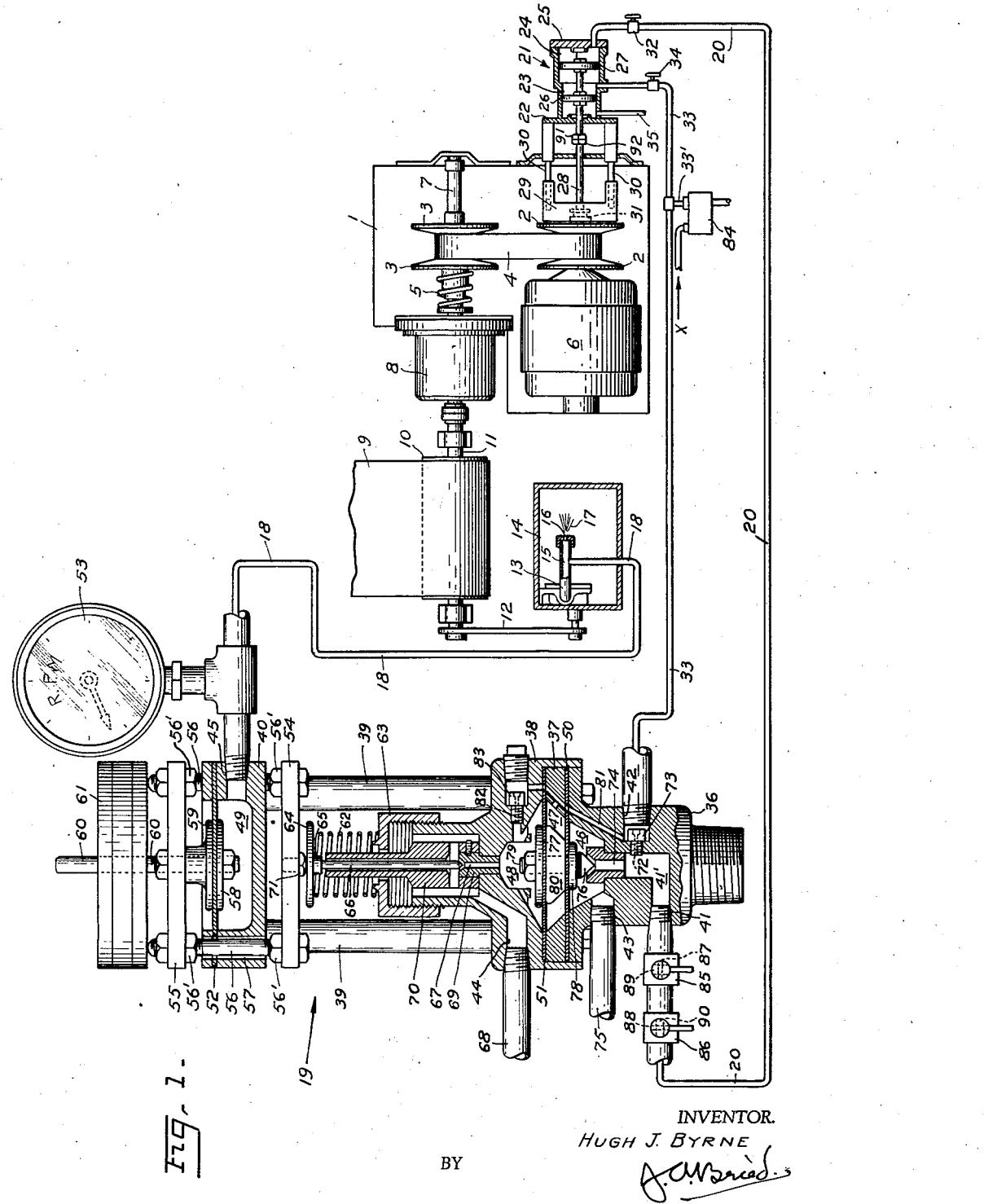
INVENTOR.
HUGH J. BYRNE
BY
ATTORNEY.

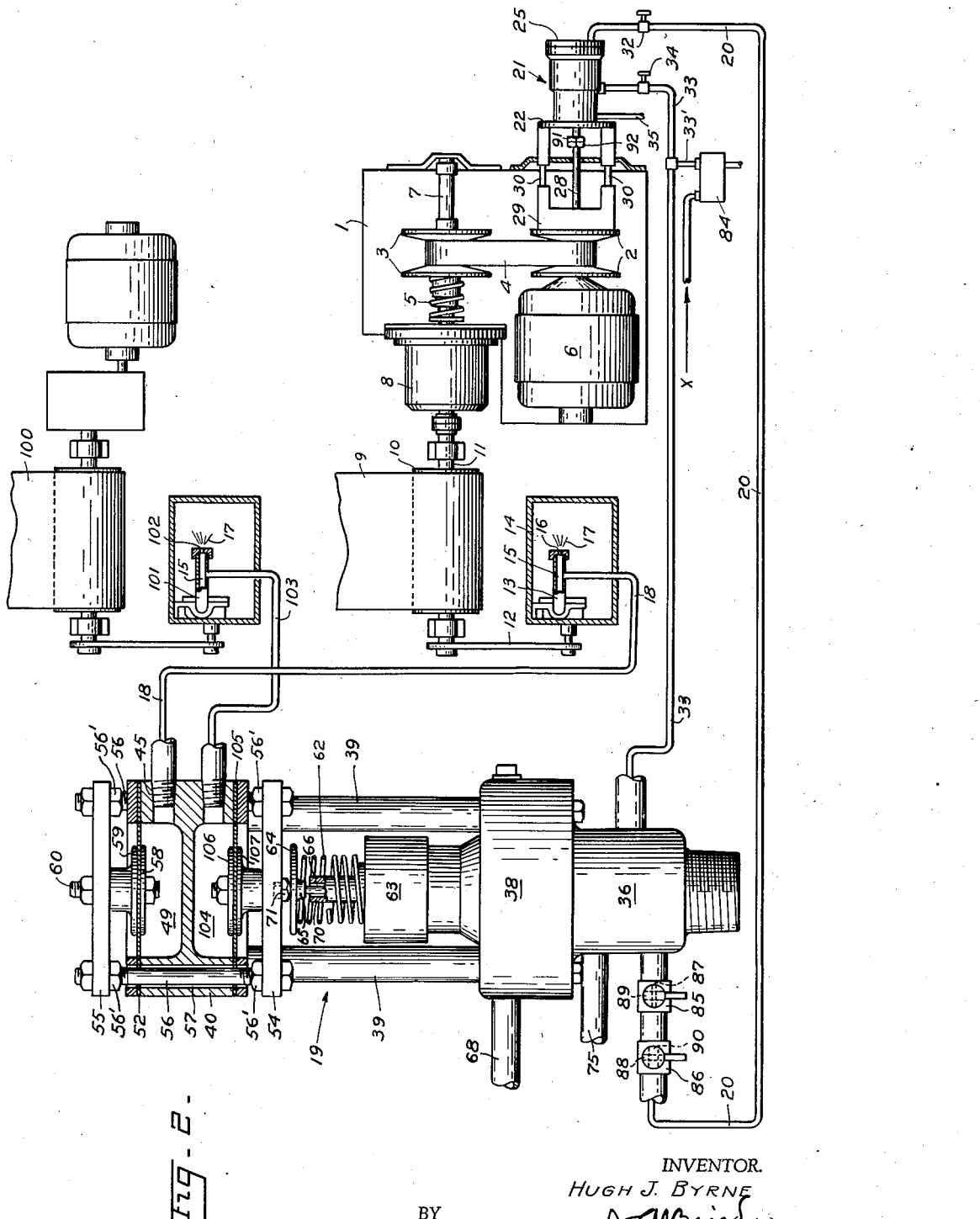

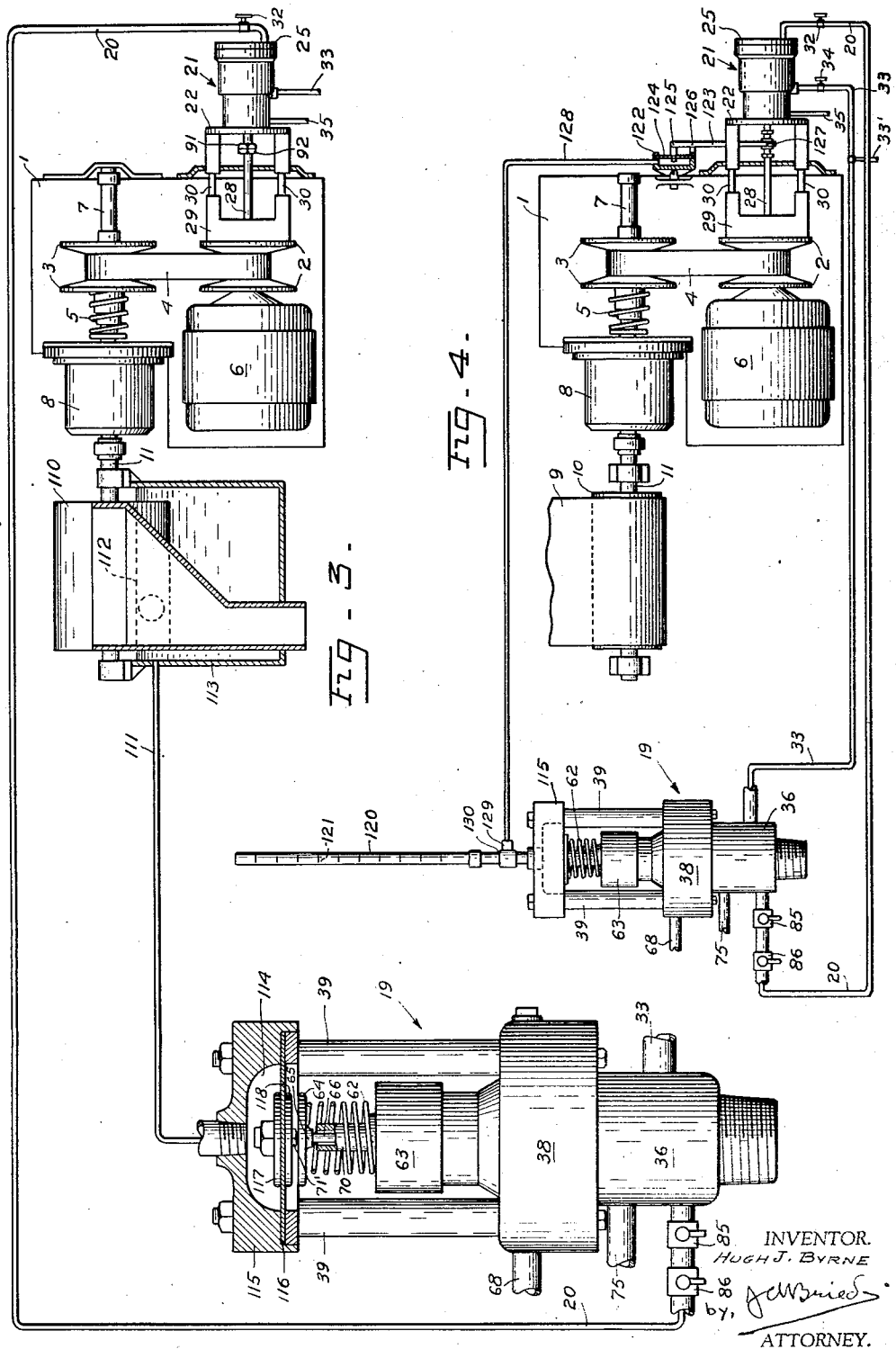

Patented Dec. 5, 1939

2,182,310

UNITED STATES PATENT OFFICE 2,182,310

AUTOMATIC VARIABLE SPEED CONTROL MECHANISM

Hugh J. Byrne, Oakland, Calif.

Application February 15, 1937, Serial No. 125,822

7 Claims. (Cl. 74—230.17)

This invention relates to the automatic regulation of the speeds of machines in general, and the principal object of the invention is to provide improved automatic means for regulating the speeds of industrial equipment through the intermediary of a Reeves variable speed transmission or equivalent mechanical speed varying device. A further object of the invention is to provide means for the purpose set out which will provide for remote control of the speed of the driven machine or piece of equipment. A further feature is the provision of a fluid operated speed indicator at the point of said remote control.

A still further object is to provide for the relative control of two or more driven machines or pieces of equipment, one of which may form the basis for the control of the others. Other objects are reliability of performance, simplicity of construction and low cost compared to prior apparatus for similar purposes. Other objects and advantages of the invention will appear in the following specification and accompanying drawings. It should be noted that divisional patent applications have been filed on some of the forms of the inventions herein disclosed under Serial Numbers 303,250, and 303,251, both filed on date of November 7, 1939.

In the drawings:

Figure 1 is a schematic plan of a Reeves transmission driven conveyor controlled in accordance with my invention and with the pilot valve shown in section to larger scale;

Figure 2 is a plan of an installation similar to that of Figure 1, but showing two conveyors, one of which forms the base load or speed element from which the other is controlled through my improved automatic apparatus;

Figure 3 is a schematic plan of an installation, or speed control system, in accordance with my invention wherein the speed of a Reeves driven rotary filter is controlled by liquid level through means of my apparatus;

Figure 4 is a similar plan view showing the control of the speed of a Reeves driven conveyor by my invention including the use of a variable liquid column to operate the pilot.

Before describing my invention in detail, it may be stated that various types of industrial machinery, particularly material conveying equipment, are driven through the intermediary of variable speed transmissions, and that of such transmissions the one known as the "Reeves variable speed transmission" is commonly employed for the purpose and it is to automatically operate the Reeves with which the present invention is primarily concerned.

The Reeves device comprises a frame 1 with two pairs of confronting cone pulleys 2, 3 rotatably mounted on it, each pair respectively on the driving and driven shaft, and the pulleys connected by a special bevel edge belt 4, the arrangement being such as to permit the pulleys of each pair to be opened and closed, that is, slid axially on their shafts, to force the belt to ride at its edges at different diameters depending on the spacing of the pulleys of each pair, the usual construction providing hand-operated means, not shown, for opening and closing one pair of pulleys, and a spring 5 on the other pair forcing the pulleys 3 of that pair to proper position to accommodate the particular position of the belt. Some of the models have a leverage arrangement for positively closing one pair of the pulleys proportionately as the other pair is opened.

The present invention automatically operates the pulleys under control of some output function of the machine to be driven, or the work to be done.

In the drawings my apparatus is operatively connected for shifting the driving pulleys 2, though it may operate either or both pair, depending on the particular construction of the Reeves, and the driving pulleys, or rather the shaft on which they are mounted (not shown) is driven by any source of mechanical power, generally a motor 6, and the driven pulley shaft 7 may extend through a set of reduction gearing in a casing 8, and which may or may not incorporate a suitable clutch for disconnecting the driven machine from the driven shaft of the Reeves if desired.

In Figure 1 the driven machine is a belt conveyor 9 passing over a driving pulley 10 on a shaft 11 connected to the gear reduction output shaft or driven shaft 7, as may be desired, of the Reeves, while geared to, connected by chain drive 12, or otherwise positively driven by the conveyor shaft 11 is a small rotary pump 13 of the positive type, such as a gear or eccentric pump, operating in or over a tank 14 and arranged to draw a liquid, preferably oil 15, therefrom and restrictively ported at 16 to discharge back into the tank as at 17, while at the same time build up a pressure in a side outlet pipe 18 as indicated. This type of pump is preferred as its performance characteristics at various speeds are more adapted to my speed controlling system.

The liquid pressure pipe 18 leads to any remote point to the upper end of the controlling or pilot valve generally designated at 19, while from the lower end extends another pipe 20 leading to an hydraulic cylinder 21 firmly mounted on a suitable bracket 22 axially in line with pulleys 2. Cylinder 21 is really two cylinders of different diameter, or one casting bored out to form an inner cylinder 23 with a larger cylinder 24 extending outwardly therefrom and closed by a head 25. Each cylinder is provided with a nicely fitting piston 26, 27, of any approved design, including the usual cup leathers or sealing rings spacedly secured to a common piston rod 28 which is secured at its inner end to a yoke 29 slidably supported on two guides 30, and which yoke engages a suitable anti-friction collar 31 on the outer of pulleys 2 for sliding the pulley back and forth as the pistons are moved in their cylinders. Pipe 20 enters the outer end of the large cylinder 24 through head 25 and may conveniently be provided with a shut-off valve 32. Cylinder 23 is also provided with a pipe 33 which enters adjacent its outer end and may also have a shut-off valve at 34, while at the inner end of cylinder 23 is an open drain pipe 35 to carry away any seepage which may get past piston 26. With the construction of the two diameter cylinder with the two different sized pistons in it as described, a differential piston is provided so that with a liquid under the same pressure supplied to both bores through pipes 20 and 33, the piston assembly, yoke 29, and outer pulley 2, would move inward or to the left in Figure 1, (by reason of the greater area of the outer cylinder) to thereby move cone pulleys 2 closer together, and force the belt to ride on a larger diameter while at the same time reducing the effective diameter of pulleys 3 and thus increase the speed of the driven shaft 7 and conveyor 9.

If the liquid pressure in the outer end of cylinder 24 were lowered by any means to a point below the effective pressure against the inner side of piston 27 reacting from the inner shoulder where it meets the reduced bore, the assemblage including the outer pulley 2, would move outward and thereby reduce the speed of the conveyor.

By the use of two different sized pistons secured to one rod and working in a differential bore cylinder as described, I avoid the use of stuffing boxes on the rod and thereby eliminate entirely this uncertain factor in affecting sensitiveness of the apparatus and response of control, and also make it possible to use a single pilot controlled pressure line 20 to operate the pistons.

The length of stroke of the pistons and consequent movement of the pulleys in either direction may be limited by stop nuts 91, 92.

In practice a constant liquid pressure is maintained in pipe 33, through branch pipe 33', from any desired source X and the pressure in pipe 20 is varied through the action of my automatic pilot under the influence of the varying pressure in pump line 18.

The pilot, shown enlarged in the drawings, comprises a suitably supported fixed body, generally located at the remote control point desired though it may be close to the machine if desired. The body is made in several pieces 36, 37, 38, 39, 40 suitably secured together and formed to provide various threaded ports 41, 42, 43, 44, 45, and chambers 46, 47, 48, 49 as shown, and with flexible (preferably rubber fabric) diaphragms 50, 51, separating chamber 7 from chambers 46 and 48, and a similar diaphragm 52 closing the upper side of chamber 49.

Oil pressure pipe 18 opens to chamber 49 and at any desired place on the pipe is a pressure indicator 53 which may be graduated in terms of pressure, and also in terms of speed of the conveyor 9, or revolutions per minute of its driving pulley 10, as will later appear.

Chamber 49 is in member 40 fixedly supported on uprights 39, and vertically slidable in member 40 is a yoke comprising a pair of plates 54, 55, spaced by bolts 56 which are slidable in vertical openings 57 in member 40, and plate 55 is secured to a diaphragm 52 as by clamping washers 58, 59 and bolt 60, which extends upward and centers one or more apertured weights 61 which normally tend to force the yoke and diaphragm downwardly within the small limits permitted by the nuts 56' on bolts 56.

Below the lower yoke plate 54 is a compression spring 62 reacting between an adjusting nut 63 and a flange 64 secured to or formed on the upper enlarged portion 65 of a needle valve 66, and which needle valve is adapted to more or less close a relief passage 67 leading from chamber 48 to port 44 and waste pipe 68. The structure includes, for purposes of construction, nipples 69 and 70 for facilitating aligning of the relief passage and needle valve. Flange 64 is for a similar purpose provided with a flat upper surface bearing against a rounded screw 71 projecting from plate 54, but these details of construction may vary considerably.

With the arrangement described it will be seen that any variation of oil pressure in chamber 49 due to varying speed of the conveyor will at once react against flexible diaphragm 52 and, through the yoke 54—55, tend to lessen or increase the effective weight 61 in its relation to compression spring 62 and to thereby change the opening of the needle valve 66.

Port 41 connects to pipe 20 from the large bore of cylinder 21, while port 42 connects to pipe 33 from the smaller bore and communicates with a chamber or extension 41' of port 41 through a small restricted passage 72 in a threaded nozzle 73. Chamber 41' communicates by way of a smaller passage 74 with port 43 and waste pipe 75, and passage 74 is beveled outwardly at its upper end and surmounted with a loose or floating conical valve 76 which may be forced downward to more or less close the passage upon the downward flexing of diaphragms 50 and 51 which are clamped firmly at their margins to the pilot structure 36—38, and also at their centers by washers 77, 78, the latter of which may be the head of a bolt 79 which passes through a tapered spacer 80, so that the diaphragms will flex together when the pressure is varied above diaphragm 51.

Extending from port 42 is a small passage 81 which continues through the clamped margins of both diaphragms 50, 51 as indicated and connects with chamber 47, and also connects through a reduced size passage 82 in a nozzle 83 with chamber 48.

To definitely limit the speed of shifting the Reeves pulley 2 by the hydraulic cylinder 21, one or more service cocks 85, 86 with a different fixed size restricted opening 87, 88, may be included in pipe 20, each plug also having a large bore 89, 90 equal to the maximum capacity desired for pipe 20. Thus by simply throwing either plug to bring its restricted opening in line with the pipe and the other with its large opening, the desired speed of operation of the control may be had without the use of needle valve adjustments which is uncertain and objectionable.

In operation of the system, with a liquid, say service water at constant pressure, admitted to the system from a source X into pipe 33' after first passing through a suitable straining device 84, strained water is supplied to cylinder 23, and also to the pilot valve 19 entering passage 81 from which it flows to chamber 47, also through orifice 82 to chamber 48 and through orifice 72 to chamber 41'.

From chamber 48 the water will flow past the needle valve 66 at a rate dependent on its degree of opening and into waste pipe 68. Chamber 47 is always open to full pressure of the water, and chamber 41' leads back through passage 41, pipe 20, and cocks 85, 86 to the outer end of large cylinder bore 24 and also by way of passage 74 past floating valve 76 to waste pipe 75. The pressure in the large cylinder 24 will therefore depend on the opening of valve 76 as it controls an outlet for the water far greater than restricted inlet orifice 72, and when valve 76 is fully open the pressure in chamber 41', pipe 20 and cylinder 24 may drop to zero.

As previously explained, change of oil pump pressure due to any variation in the conveyor speed, controls the degree of opening of the needle valve 66 (which is never quite closed) and thus varies the pressure in chamber 48 and its effect on diaphragm 51. Full pressure being always maintained in chamber 47 from passage 81 effects a constant upward force on plug 80 due to difference of exposed areas of diaphragms 50 and 51 to fluid pressure in chamber 47, and if the pressure in 48 falls to practically zero, as it would when needle valve 66 is raised, disk 78 rises and permits floating valve 76 (preferably made of hard rubber or the like) to rise, and thereby drop pressure in chamber 41' to a minimum.

As orifice 74 is of much greater area than orifice 72, the opening of the former will permit complete drainage from the latter, and also permit the water to drain out from cylinder 24 through pipe 20 to chamber 41' through chamber 46 and out via waste pipe 75. The consequent decrease of pressure in cylinder 24 causes the piston or plunger assembly 26—27 to move outward or toward the large cylinder head 25, and therefore separates Reeves pulleys 2 and decreases the speed of the conveyor, the motivating force being obtained from the unbalanced pressure forces on pistons 26, 27.

Decreasing the speed of the conveyor at once decreases the speed of the oil pump 13 and drops the oil pressure in pipe 18 and diaphragm chamber 49 to thereby increase the effective downward force of weight 61 to thereby lower the needle valve 66 slightly and restrict somewhat the flow from passage 67 and hence build up increased pressure in chamber 48. This increased pressure in chamber 48 forces diaphragms 51 and 50 downward and more or less closes valve 76 to thereby at once increase the pressure in chamber 41' and pipe 20 to large cylinder 24 to move the piston assembly inward and thereby again increase the speed of the "Reeves" and belt conveyor to the point which the apparatus was set to maintain.

In practice the needle valve 66 is always riding on a small jet of water from orifice 67 and its actual movement up and down is only about .003". There is no friction on the needle as it is a very loose fit in its guide piece 70.

By the action described the speed of the conveyor will be very accurately controlled under varying loads and without any objectionable "hunting" action.

In order to set the apparatus, or vary it to give any desired speed to the conveyor, (or other machine being run by the "Reeves") any of several means may be employed. One way would be to reduce down or open up the oil pump orifice 16 to change the effective oil pressure on diaphragm 52. Another would be to change or vary the weight 61 as by adding additional weight disks or removing some, but I prefer to provide a threaded adjusting nut 63 on the pilot head under spring 62 which may be screwed up or down to thus vary the effective weight of the yoke 54—55 and its weights 61. No matter what the weight 61, or adjustment of spring 62, the gage pressure of oil in pipe 18 would be an index of the speed of conveyor 9, and the gage may therefore be graduated in terms of speed of the conveyor, or revolutions of shaft 11.

In Figure 2 the arrangement shown is similar to that of Figure 1 except that an additional belt conveyor and oil pump are shown and the upper end of the pilot is changed in construction.

Since most of the features of Figure 2 are identical with those shown and described for Figure 1, all similar parts are designated by the same numerals used in Figure 1 and only the parts at variance therewith bear new numbers.

The additional conveyor is shown at 100 and forms what may be termed a base load or base speed conveyor from which the speed of the other conveyor 9 is controlled through means of my apparatus. The base load conveyor need not be a conveyor, nor need the first one 9 be a conveyor, as any two similar or dissimilar driven machines may be substituted, the illustration of two conveyors being merely to show the automatic control of one Reeves driven machine from another independently driven machine perhaps at some remote point, through my pilot control.

The base load conveyor 100 is like conveyor 9 arranged to drive a positive type oil pump 101 with restricted escape at 102 to build up a pressure in pipe 103 dependent upon the speed of the pump, and the oil under pressure is carried to a special diaphragm chamber 104 in the upper end of the pilot 19 to take the place of weights 61 shown in Figure 1.

In this modification the weights are omitted but chamber 49, its connection to the first oil line 18, and the construction of yoke 54, 55, are the same as explained for Figure 1, except that fixed member 40 is made thicker so as to accommodate chamber 104 (below chamber 49) wh'ch is closed on its lower side by a flexible diaphragm 105, clamped between washers 106, 107, the latter of which bears on the upper side of lower yoke plate 54.

By the arrangement shown, the speed of conveyor 9 would automatically be maintained proportional to the speed of conveyor 100 dependent upon the adjustment of spring 62 of the pilot, as any variation in its oil line pressure transmitted to chamber 49 will influence the needle valve of the pilot by way of yoke 54, 55, 56, as described, and at the same time the speed of the conveyor 9 will speed up or slow down to follow any change in the speed of the base load conveyor 100 as its oil pressure will correspondingly rise or fall in chamber 104 to be transmitted through diaphragm 105 to either force yoke plate 54 down or permit it to rise. When forced down by increase of pressure in 104, it will close the needle valve somewhat and increase the speed of the Reeves and conveyor 9 in conformity and vice versa.

In the modification shown in Figure 3 the parts are all identical with those of Figure 1 where similarly numbered, the only difference being that instead of showing automatic control of the speed of a "Reeves" by oil pressure developed in a pump operated by the driven machine, the oil pump is dispensed with and the liquid head in a rotary filter driven by the "Reeves" is used to vary the opening of the needle valve.

In Figure 3 at 110 is indicated the drum of a rotating filter driven by the Reeves 1 and its reduction gearing 8, while at 111 is a pipe leading from a point below the lowest level of liquid 112 in the filter tank 113 conveying the liquid to a diaphragm chamber 114 formed in a member 115 fixedly secured to the upper end of pilot frame uprights 39.

A flexible diaphragm 116 closes the bottom of the chamber and is clamped between two washers 117, 118, the lower one of which has a projecting rounded bolt head 71' bearing against the upper flat face of flange 64 secured to the upper end of the needle valve stem 65.

By the construction shown, upon increased liquid pressure in chamber 114 by reason of undue rise of liquid in tank 113, increased pressure will force diaphragm 116 downward against the adjusted force of spring 62 and close the needle valve 66 somewhat, to thereby increase the speed of the Reeves and filter drum, thereby increasing the filtration rate which will lower the water level in the filter tank 113, and vice versa.

The modification of Figure 4 is similar to that of Figure 3 as the pilot head is identical, but here a vertical stand-pipe or tube 120 of small diameter is secured to the top of chamber 114. The tube is vented to atmosphere at its upper end and contains a high enough column of water or oil 121 to give the maximum liquid pressure desired in the chamber to balance spring 62. The effective head or pressure of the liquid is automatically varied upon any adjustment of the spring until the balance is reestablished to maintain the speed constant at the adjusted rate as follows:

The variation in head of liquid in the tube is carried out by means of a relatively large expansible chamber 122 connected to the liquid column of tube 120 by a pipe 128 and the chamber is conveniently secured to the frame 1 of the "Reeves" and operated by a pivoted lever 123 moved back and forth by longitudinal movement of the piston rod or shaft 28.

The expansible chamber 122 which may be a metal bellows, or a piston, is here shown as a cylindrical chamber closed on one side by a large flexible diaphragm 124 to the center of which the end of the lever is pivotally connected at 125. The lever is fulcrumed at 126 to the margin of the chamber and the longer or free end of the lever is yoked to a collar on the rod 28 as indicated at 127 so that it will follow the motions of the rod in opening and closing Reeves pulleys 2.

By this means, to change the speed of the Reeves, say to increase it, adjusting nut 63 is screwed down somewhat, thereby slacking off on the upward force of compression spring 62 against diaphragm 116 and thus increasing the effective head or pressure of the standing column of liquid 121 in chamber 114 and thereby forcing the needle valve 66 to close slightly. This at once builds up increased pressure in pipe 20 as explained for Figure 1, and moves rod 28 toward the left and closes pulleys 2 somewhat to increase the speed of the Reeves and conveyor driven thereby.

This motion of rod 28 would keep up until stopped by some other function of the apparatus. However, as rod 28 moves to the left, it carries the long end of lever 123 with it and pulls diaphragm 124 outward to expand chamber 122 and thereby draws more liquid from pipe 128 into it to quickly drop the column in tube 120 to a point where it permits the needle valve to rise again slightly to the neutral point, or where valve 76 is just open sufficiently to pass the water from orifice 72 without there being any flow in either direction in pipe 20 and hence holding the piston assembly in cylinders 21 locked.

It will be evident that instead of using the open variable liquid column 120, to change the pressure in chamber 114, fitting 129 may be closed at 130 and a gas under pressure used in pipe 128 which would be varied as the expansion chamber 122 was expanded or contracted.

Having thus described my improved control of Reeves driven industrial equipment and some of the various arrangements it may take, it will be evident that it will also operate on other speed reducing devices than the Reeves provided with a member for moving back and forth to change the speed, which may be operated by my hydraulic cylinder shifting arrangement, and therefore the use of the word "Reeves" in my claims is to be understood as including similar devices.

It may also be stated that with respect to Figures 1 and 2 instead of using oil pumps 13 and 101 driven by the conveyors, air or gas pumps may be used to build up a pressure in pipes 18 and 103, though a liquid is much preferred as its pressure may be more definitely controlled. Also the use of a liquid in cylinders 23, 24 provides a definite locked position of the shaft or pulley shifting rod 28 and insures against any change in adjustment of pulleys 2 until moved by pilot action, yet a gas might be used instead of a liquid where inferior results would satisfy. Hence, any use of air or gas in place of the hydraulic means shown and described herein is to that extent intended to be covered as an inferior substitute in my appended claims by my use of the words hydraulic and liquid.

I claim:

1. Means for controlling a variable speed transmission having a shiftable element for changing its speed which comprises an hydraulic piston operatively connected to said element for shifting the same, means for admitting a liquid under pressure to and for operating the piston, a pilot arranged and adapted for controlling the flow of liquid to and from said piston, a fluid pressure line having a constant volume of fluid therein extending to said pilot and arranged to influence the pilot in controlling said flow, and means for varying the fluid pressure in said line comprising an expansible chamber open to said line, and means for expanding and contracting said chamber.

2. In a machine driven by a variable speed transmission having a shiftable speed changing element, means for automatically shifting said element comprising a rotary fluid pump in geared connection with said machine and provided with a fluid pressure line extending therefrom, a power cylinder connected to and for positively shifting said element, pipe means for introducing fluid under pressure to said cylinder for operating the same, a pilot valve controlling flow of fluid in said pipe means, and means for controlling said pilot valve in response to varying pressure in said fluid pressure line to keep the speed of the machine substantially constant.

3. In a machine driven by a variable speed transmission having a back and forth shiftable speed changing element, means for automatically shifting said element comprising a rotary fluid pump in geared connection with said machine and provided with a fluid pressure line extending therefrom, an hydraulic power cylinder connected to and for positively shifting said element in both directions, pipe means for introducing liquid under pressure to said cylinder for operating the same, a pilot valve controlling flow of liquid in said pipe means, and means for controlling said pilot valve in response to varying pressure in said fluid pressure line to keep the speed of the machine substantially constant.

4. In a machine driven by a variable speed transmission having a shiftable speed changing element, means for automatically shifting said element comprising a rotary fluid pump in geared connection with said machine and provided with a fluid pressure line extending therefrom, a double-acting hydraulic cylinder connected to and for positively shifting said element in both directions, pipe means for introducing liquid under pressure to said cylinder for operating the same, a pilot valve controlling flow of liquid in said pipe means, and means for controlling said pilot valve in response to varying pressure in said fluid pressure line to keep the speed of the machine substantially constant.

5. In a machine driven by a variable speed transmission having a shiftable speed changing element, means for automatically shifting said element comprising a liquid pressure line, a liquid pressure generating device operated by said machine arranged for varying the pressure in said line in conformity with the speed of said machine, a power cylinder connected to and for positively shifting said element, pipe means for introducing fluid under pressure to said cylinder for operating the same, a pilot valve controlling flow of fluid in said pipe means, and means for controlling said pilot valve in response to varying pressure in said liquid pressure line to keep the speed of the machine substantially constant.

6. In a structure as set out in claim 2, manually adjustable means for varying the effective operation of said pilot valve.

7. In a structure as set out in claim 4, manually adjustable means for varying the effective operation of said pilot valve.

HUGH J. BYRNE.